United States Patent [19]
Silagy

[11] Patent Number: 6,115,890
[45] Date of Patent: Sep. 12, 2000

[54] CORD AND A POSITIONED SPHERICAL CLAMP

[76] Inventor: Howard Silagy, 100A Tec St., Hicksville, N.Y. 11801

[21] Appl. No.: 09/303,444

[22] Filed: May 3, 1999

[51] Int. Cl.[7] ............................ A44B 11/25; A44B 21/00; F16B 35/02
[52] U.S. Cl. ................. 24/135 R; 24/115 M; 24/135 N; 24/136 L; 411/385
[58] Field of Search ............................ 24/135 N, 135 R, 24/136 R, 136 L, 115 M; 411/385; 439/780

[56] References Cited

U.S. PATENT DOCUMENTS

| 147,928 | 2/1874 | Fry | 24/136 R |
|---|---|---|---|
| 1,057,484 | 4/1913 | Huber | 24/135 N |
| 1,370,544 | 3/1921 | Leeper | 24/135 R |
| 1,677,783 | 7/1928 | Kearney | 439/780 |
| 1,823,677 | 9/1931 | Bay | 411/385 |

FOREIGN PATENT DOCUMENTS

| 0640267 | 12/1936 | Germany | 24/135 R |
|---|---|---|---|
| 0366426 | 12/1938 | Italy | 24/135 N |
| 0162366 | 4/1921 | United Kingdom | 24/135 R |

*Primary Examiner*—Victor N. Sakran
*Attorney, Agent, or Firm*—Myron Amer PC

[57] ABSTRACT

A two-piece clamp, of a spherical shape convenient for use as a hand grip, attached about a cord in an interposed position therebetween, which impales the cord with pointed teeth so that the clamp holds fast to its position at the attachment site despite forces exerted longitudinally of the cord.

1 Claim, 1 Drawing Sheet

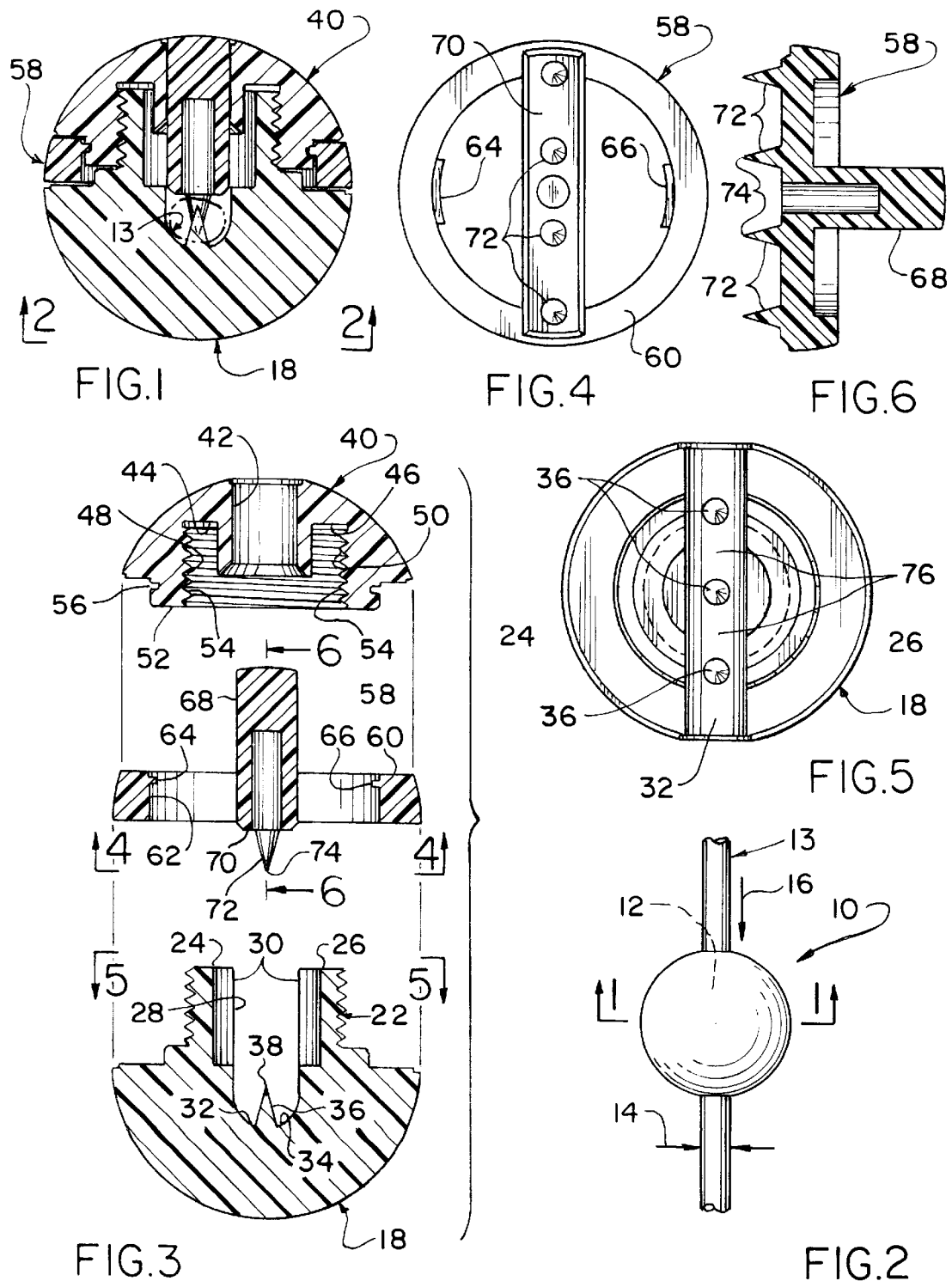

CORD AND A POSITIONED SPHERICAL CLAMP

The present invention relates generally to a structural combination of a small diameter spherical clamp positioned on a string-like cord, the latter of a type having the spherical clamp on one or both ends of a drawstring, or on the pulling end of a cord for raising and lowering a venetian blind, or for other similar diverse end uses, and more particularly relates to improvements in the spherical clamp to enable it to hold fast its position on the cord despite forces exerted longitudinally of the cord tending to dislodge it from its site of attachment.

EXAMPLE OF THE PRIOR ART

Clamps, of spherical or other shapes, which attach to cords or the like are well known, as exemplified by U.S. Pat. No. 1,677,783 issued to J. R. Kearney for "Electrical Connection" on Jul. 17, 1928. In the '783 patent and all other known patents, the clamping components, consisting of a bolt and a nut, are closed about a circular cord and there is reliance solely on friction to prevent slippage of the nut and bolt from the site of attachment. Relying on friction alone however, may not be adequate in circumstances where the force applied to the nut and bolt is greater than the friction. This is particularly so if the construction material of the cord is compressible and the diameter of the cord undergoes a reduction either over time, or possibly due to circumstances of use.

Broadly, it is an object of the present invention to provide a cord with a positioned spherical clamp thereon overcoming the foregoing and other shortcomings of the prior art.

More particularly, it is an object to supplement the frictional holding force with an established physical engagement to the cord during the clamping procedure, all as will be better understood as the description proceeds, which combination friction and physical engagement prevents dislodgement of the spherical clamp from its selected position of attachment to the cord.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a cross sectional elevational view, on an enlarged scale as seen along line 1—1 of FIG. 2, of an assembled spherical clamp according to the present invention positioned on a cord;

FIG. 2 is a view of the spherical clamp, in its approximate scale as used, as seen in the direction of the rows 2—2 of FIG. 1;

FIG. 3 is, like FIG. 2, a cross sectional view, but illustrating the components of the spherical clamp in exploded perspective;

FIG. 4 is a view of a washer component as seen in the direction of the arrows 4—4 of FIG. 3;

FIG. 5 is a view similar to FIG. 4, but of a nut component as seen in the direction of the arrows 5—5 of FIG. 3; and FIG. 6 is a cross sectional view of the washer component of FIGS. 3 and 4, but illustrated in another perspective as taken along line 6—6 of FIG. 3.

There is a need for an object to be used as an attachment to a cord, such as the within spherical clamp 10 shown in FIG. 2 attached, as at 12, to a round cord 13 of a specified diameter 14, appropriate for use as a handgrip on a cord for opening and closing a window blind, or the end of a drawstring cord, and other end uses almost too numerous to list. A requirement of these end uses is that the spherical clamp 10 be readily attached to the cord 13 and hold fast its attachment at the selected site 12 despite longitudinal forces 16 exerted lengthwise of the cord 13 which would have a tendency to dislodge the spherical clamp 10 from the site 12.

In a preferred embodiment, spherical clamp 10 includes, as one component, a spherical bolt 18 with a head 20 and having externally threaded, as at 22, a pair of bifurcated legs 24 and 26, which bound therebetween an open ended compartment 28, the opening 30 thereof being at one end of the compartment 28 and a bottom, in the specific shape of a semi-circular recess 32 being at the opposite end of the compartment.

Extending into the compartment 28 from the bottom wall 34 bounding the recess 32 are a select number, in this case three, of conically shaped teeth, individually and collectively designated 36, each with a pointed tip 38, the utility of which teeth will soon be apparent.

The other external component cooperating with bolt 18 is a matching, spherical shaped nut 40, having a central through bore 42, and blind through bores 44 and 46 which are each internally threaded, as at 48 and 50, the location the threads 48, 50 of the nut 40 being understood to be in alignment with the bolt threads 22, such that use of the threads 22, 48, 50 are effective to threadably engage the nut 40 and bolt 18 to each other, in a manner well understood.

Completing the construction of the nut 40 is a depending ring 52, formed on the nut 40, which presents an inboard surface which is an extension of the threads 48, 50 and is itself threaded, as at 54, and an outboard surface which is notched, as at 56, to serve as a race, such as is typically used in bearings, which in this case enables rotation of the nut 40 without similarly urging in rotation a structure seated in the race or notch 56.

A remaining internal component, which in use is in an interposed position between the bolt 18 and nut 40 is a similarly spherically shaped washer 58. Washer 58 has a full diameter disc-like body 60 with a through bore bounding a surface 62 which aligns with the notches 56 of the nut 40 and has inwardly extending arcuate (see FIG. 4) projections 64 and 66, which are adapted by the plastic construction material of at least the washer 58 to snap into seated relation into the oversized notch or race 56 so that rotation of nut 40 is a degree of movement that has no effect on the washer 58.

Washer 58 is formed with a cylindrical rearwardly extending, as depicted in FIG. 3, projection 68 which, in use, tracks in the nut through bore 42, to contribute to holding the nut and washer assembled to each other while not impeding linear movement in the washer or rotative movement in the nut.

Completing the construction of the washer 58 is a front surface 70 having a select number, in this case four, of essentially duplicates of the teeth 36, designated individually and collectively on the washer 58, as 72, each also having a pointed tip 74, it being understood that the teeth 36 and 72 are in offset relation to each other so that during closing of teeth 72 with teeth 36, teeth 72 occupy the open spaces 76 between the teeth 36 and on opposite sides thereof.

To clamp the spherical clamp 10 onto a cord 13, the cord is positioned transversely of the compartment 28 and preferably manually moved against the teeth 36 so that the cord 13 is penetrated by the pointed tips 38 and impaled from one side by the teeth 36. Next, the nut 40 with the washer 58 attached by the seated projections 64, 66 within the race or notch 56 and the extension 68 disposed within the through bore 42, is threadably engaged to the bolt by the threads 22, 48, 50, which urges the nut 40 linearly in closing movement toward the bolt 18. The washer 58, as should be readily understood, is urged in corresponding linear closing movement toward and into compartment 28, and this produces penetration of the cord 13 by the tooth tips 78 and thus the impaling from the opposite side of the cord by the teeth 72.

The impaling of a cord from even one side, and most certainly from opposite sides, on pointed teeth, as described herein has been found in practice to enable a clamp, such as the within clamp 10 to hold fast to its attached position on the cord.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination, a circular cord having a diameter and an axial length, and a spherical clamp adapted to hold fast in a position of attachment at a selected site along said cord axial length against a pulling force exerted longitudinally of said cord, said spherical clamp comprising a bolt having externally threaded bifurcated legs having in their bifurcation internal side surfaces and a bottom surface cooperating to bound a cord-engaging compartment, plural spaced apart pointed teeth projected from said bottom surface into said cord-engaging compartment, a cord disposed in said cord-engaging compartment, a nut having an internally threaded bore disposed in threaded engagement to said externally threaded legs of said bolt so as to be adapted upon rotation to be urged in closing movement toward said bolt, and a washer having an interposed operative position between said nut and bolt and plural spaced apart pointed teeth in opposite facing and offset relation to said teeth of said bolt, whereby said closing movement contributes to an impaling of said cord upon said pointed teeth to hold fast said attached position of said bolt and nut on said cord.

* * * * *